United States Patent
Chang

(10) Patent No.: US 8,499,662 B2
(45) Date of Patent: Aug. 6, 2013

(54) PULL HANDLE STRUCTURE OF A HAND PULLER

(75) Inventor: Wen Cheng Chang, Changhua (TW)

(73) Assignee: Win Chance Metal Co., Ltd., Changhua (TW)

( * ) Notice: Subject to any disclaimer, the term of this patent is extended or adjusted under 35 U.S.C. 154(b) by 305 days.

(21) Appl. No.: 12/984,045

(22) Filed: Jan. 4, 2011

(65) Prior Publication Data

US 2012/0167707 A1  Jul. 5, 2012

(51) Int. Cl.
*G05G 1/00* (2008.04)
*B60P 7/06* (2006.01)

(52) U.S. Cl.
USPC ............................ 74/491; 254/217; 24/68 CD

(58) Field of Classification Search
USPC ................... 74/491; 254/213, 214, 217, 218, 254/244–249, DIG. 3; 16/265, 237, 249
See application file for complete search history.

(56) References Cited

U.S. PATENT DOCUMENTS

| | | | | |
|---|---|---|---|---|
| 3,227,015 A * | 1/1966 | Tremblay | ..................... | 81/177.2 |
| 4,070,932 A * | 1/1978 | Jeannotte | ..................... | 81/177.2 |
| 4,199,182 A * | 4/1980 | Sunesson | ................... | 24/68 CD |
| 4,353,150 A * | 10/1982 | Docken | ........................... | 24/71.1 |
| 4,510,651 A * | 4/1985 | Prete et al. | ..................... | 24/68 R |
| 5,778,496 A * | 7/1998 | Huang | ....................... | 24/68 CD |
| 5,819,377 A * | 10/1998 | Huang | ....................... | 24/68 CD |
| 5,943,742 A * | 8/1999 | Huang | ....................... | 24/68 CD |
| 6,168,204 B1 * | 1/2001 | Beckman | ...................... | 280/797 |
| 6,513,946 B2 * | 2/2003 | Hillinger et al. | .............. | 362/119 |
| 6,532,846 B2 * | 3/2003 | Lin | .............................. | 81/177.2 |
| 2003/0071251 A1 * | 4/2003 | Hu | ................................ | 254/218 |
| 2009/0283729 A1 * | 11/2009 | Carlson et al. | ................ | 254/218 |

* cited by examiner

*Primary Examiner* — Troy Chambers
*Assistant Examiner* — Valentin Craciun
(74) *Attorney, Agent, or Firm* — Alan Kamrath; Kamrath IP Lawfirm, P.A.

(57) ABSTRACT

A pull handle structure of a hand puller contains a base including two opposite holes to insert two shafts respectively, with each hole including a ratchet. A pulling handle includes a rotating member with two side plates, each including first and second ends. Each first end includes an axial connecting portion on which a circular opening is formed so that the rotating member swings axially relative to the base. The side plate includes a sliding rail. Between the two side plates is defined a movable retaining element to contact with the ratchet. A movable bar includes two elongated stems and a grip rod defined between the two elongated stems. Each elongated stem is fitted in the sliding rail to move slidably. Between the rotating member and the movable bar is defined a locking device to obtain a positioning purpose when the movable bar is expanded and retracted.

6 Claims, 6 Drawing Sheets

PULL HANDLE STRUCTURE OF A HAND PULLER

BACKGROUND OF THE INVENTION

1. Field of the Invention

The present invention relates to a hand puller to tie merchandise on a truck or other transposition and, more particularly, to a pull handle structure of the hand puller.

2. Description of the Prior Art

A conventional hand puller is used to pull a rope tightly to tie merchandise on a truck securely, thus preventing the merchandise from falling during transportation.

The hand puller includes a base and a pulling handle, both of which are connected together by using two shafts. A pair of ratchets is fixed on two ends of the shafts respectively to be rotated with the shafts. A retaining element limits the ratchets to rotate in a single direction. Thus, the pulling handle is pulled upward and downward so that the shafts move in the single direction to roll the rope tightly, thus binding the merchandise securely. Likewise, the retaining element is capable of being pulled so that the retaining element disengages from the ratchets, thus releasing the rope.

However, the pulling handle and the retaining element of the hand puller are lengthened to enhance the pull force and a length of an arm of force, increasing a size of the hand puller and occupying a larger store space. In addition, the lengthened retaining element can not disengage from the ratchets smoothly.

The present invention has arisen to mitigate and/or obviate the afore-described disadvantages.

SUMMARY OF THE INVENTION

The primary objective of the present invention is to provide a pull handle structure of a hand puller rolling a rope tightly by using an expandable and retractable pulling handle, and a movable bar is pulled to obtain a larger pulling force to tie merchandise easily.

A further objective of the present invention is to provide a pull handle structure of a hand puller including the movable bar retracted to reduce a size of the hand puller to save store space.

Another objective of the present invention is to provide a pull handle structure of a hand puller including the movable bar retracted when releasing the rope by the pulling handle so that the retaining element disengages from the ratchet. Hence, the retaining element does not need to be lengthened, operating the retaining element smoothly.

To obtain the above objectives, a pull handle structure of a hand puller provided by the present invention contains a base and an expandable and retractable pulling handle. The base includes two opposite holes disposed on a middle section thereof to insert two shafts respectively. Each hole includes a ratchet fitted on the two shafts. The pulling handle includes a rotating member and a movable bar. The rotating member is comprised of two side plates. Each side plate includes a first end and a second end, with the first end including an axial connecting portion on which a circular opening is formed so that the rotating member swings axially relative to the base. The side plate of the rotating member includes a sliding rail disposed on an outer surface thereof, made of a metal sheet, and formed with a twist. Between the two side plates is defined a movable retaining element to contact with the teeth of the ratchet in a normal state. The movable bar includes two stems and a grip rod defined between the two stems. Each stem is fitted in the sliding rail of the side plate of the rotating member to move slidably. Between the rotating member and the movable bar is defined a locking device to obtain a positioning purpose when the movable bar is expanded and retracted.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
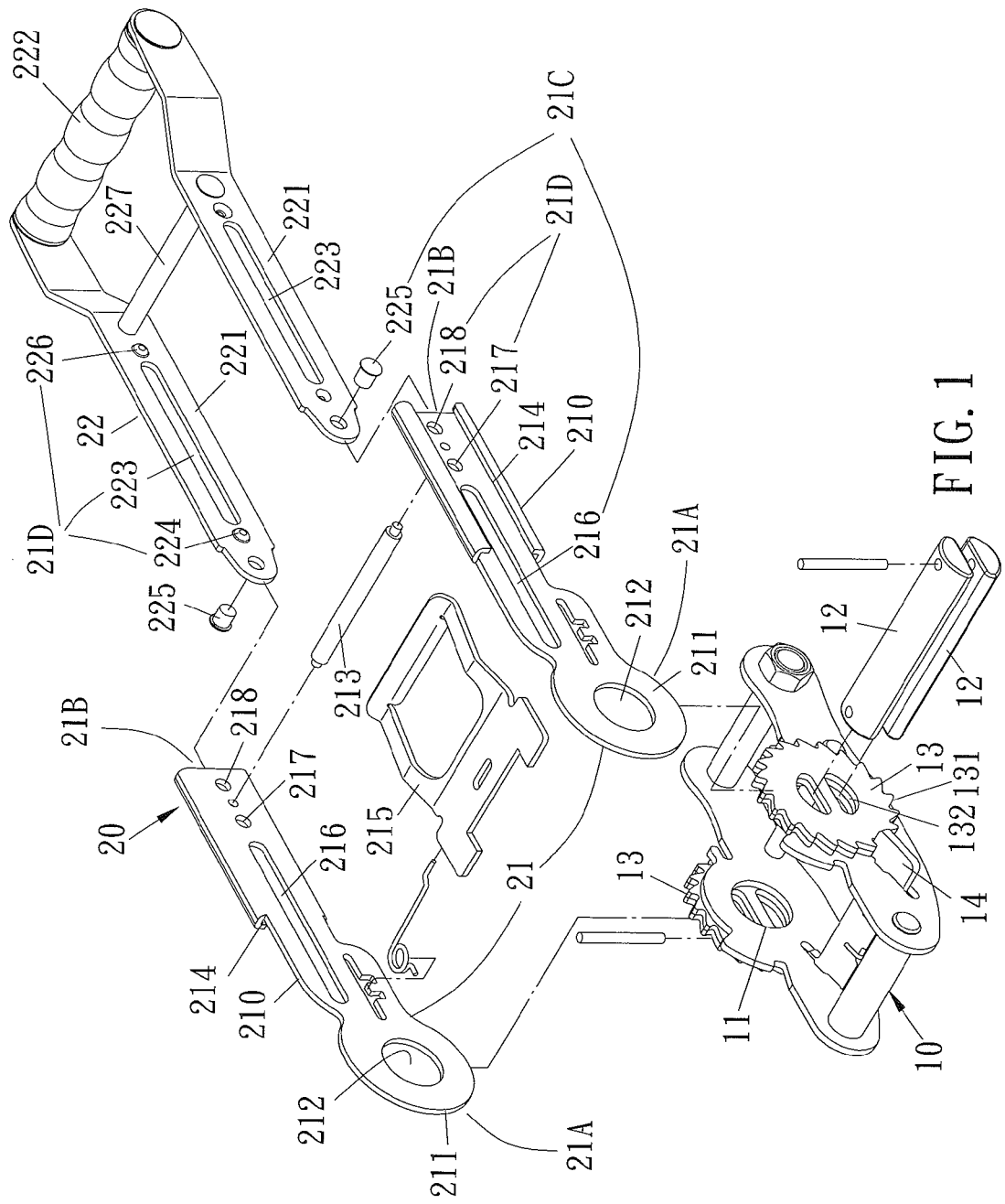
FIG. 1 is a perspective view showing the exploded components of a pull handle structure of a hand puller according to a preferred embodiment of the present invention.
Figure 2:
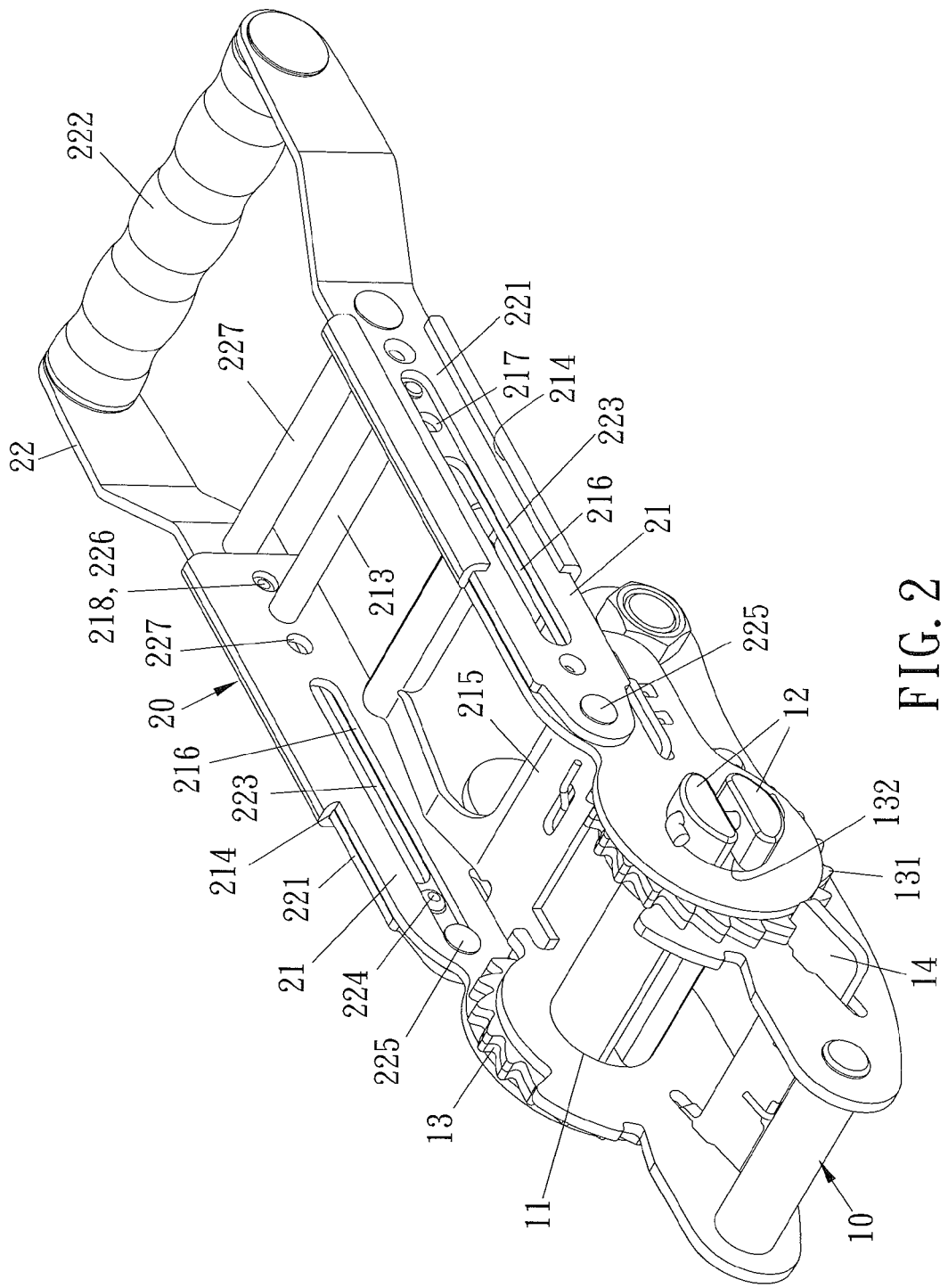
FIG. 2 is a perspective view showing the assembly of the pulling handle structure of the hand puller according to the preferred embodiment of the present invention.
Figure 3:
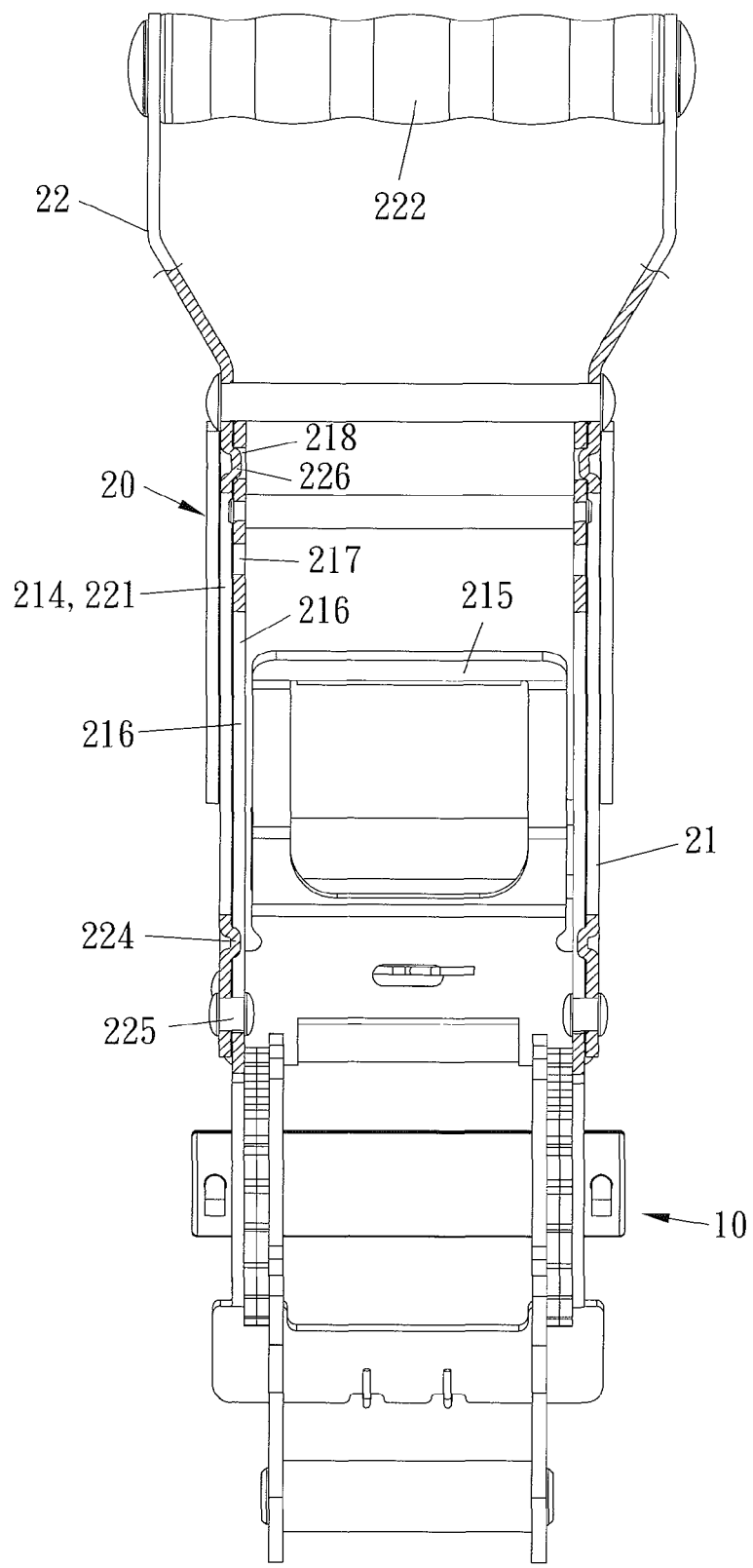
FIG. 3 is a cross sectional view showing the assembly of the pull handle structure of the hand puller according to the preferred embodiment of the present invention.

With reference to FIGS. 1-3, a pull handle structure of a hand puller according to a preferred embodiment of the present invention comprises a base 10 and an expandable and retractable pulling handle 20. The base 10 includes two opposite holes 11 disposed on a middle section thereof to insert two shafts 12 respectively. Each hole 11 includes a ratchet 13 fitted on the two shafts 12. The ratchet 13 includes a plurality of teeth 131 arranged around an outer peripheral side thereof and two orifices 132 fixed on a central portion thereof to match with the two shafts 12. The base 10 includes a movable engaging member 14 formed therein to abut against one of the teeth 131 of the ratchet 13 in a normal state. The pulling handle 20 includes a rotating member 21 and a movable bar 22, and the rotating member 21 is comprised of two side plates 210. Each side plate 210 includes a first end 21A and a second end 21B. The first end 21A of the side plate 210 includes an axial connecting portion 211 on which a circular opening 212 is formed. Between the second ends 21B of the two side plates 210 is defined a post 213. The opening 212 of the axial connecting portion 211 of the rotating member 21 is used to insert the two shafts 12 so that the rotating member 21 swings axially relative to the base 10. The side plate 210 of the rotating member 21 includes a sliding rail 214 disposed on an outer surface thereof, made of a metal sheet, and formed with a twist. Between the two side plates 210 is also defined a movable retaining element 215 to contact with another of the teeth 131 of the ratchet 13 in the normal state. The movable bar 22 includes two elongated stems 221 and a grip rod 222 defined between the two elongated stems 221. The elongated stem 221 is fitted in the sliding rail 214 of the side plate 210 of the rotating member 21 to move slidably. Between the rotating member 21 and the movable bar 22 is defined a limiting structure 21C and a locking device 21D to obtain a positioning purpose when the movable bar 22 is expandable and retracted.

The limiting structure 21C and the locking device 21D between the between the rotating member 21 and the movable bar 22 include a first slot 216 disposed in the sliding rail 214 of the side plate 210 of the rotating member 21, a first bore 217 and a second bore 218 both of which are fixed on the second end 21B of the side plate 210 of the rotating member 21. Each elongated stem 221 of the movable bar 22 includes a second slot 223 formed therein. The second slot 223 includes a first boss 224 and a defining tab 225 arranged on one end thereof away from the grip rod 222 and includes a second boss 226 secured on another end thereof. Between the two elongated stems 221 of the movable bar 22 adjacent to the grip rod 222 is defined a limit shaft 227. The defining tab 225 is limited in the first slot 216 to move. The first boss 224 corresponds to the first bore 217, and the second boss 226 corresponds to the second bore 218.

The limiting structure 21C includes the first slot 216 to match with the defining tab 225.

The locking device 21D includes the first boss 224 corresponding to the first bore 217 and the second boss 226 corresponding to the second bore 218.

In operation, the movable bar 22 is retracted so that the defining tab 225 is limited in the first slot 216 to move, and the second boss 226 retains in the second bore 218. Thus, the grip rod 222 of the movable bar 22 is held and pulls the retaining element 215 so that the retaining element 215 disengages from the ratchet 13, releasing a rope.

Figure 4:
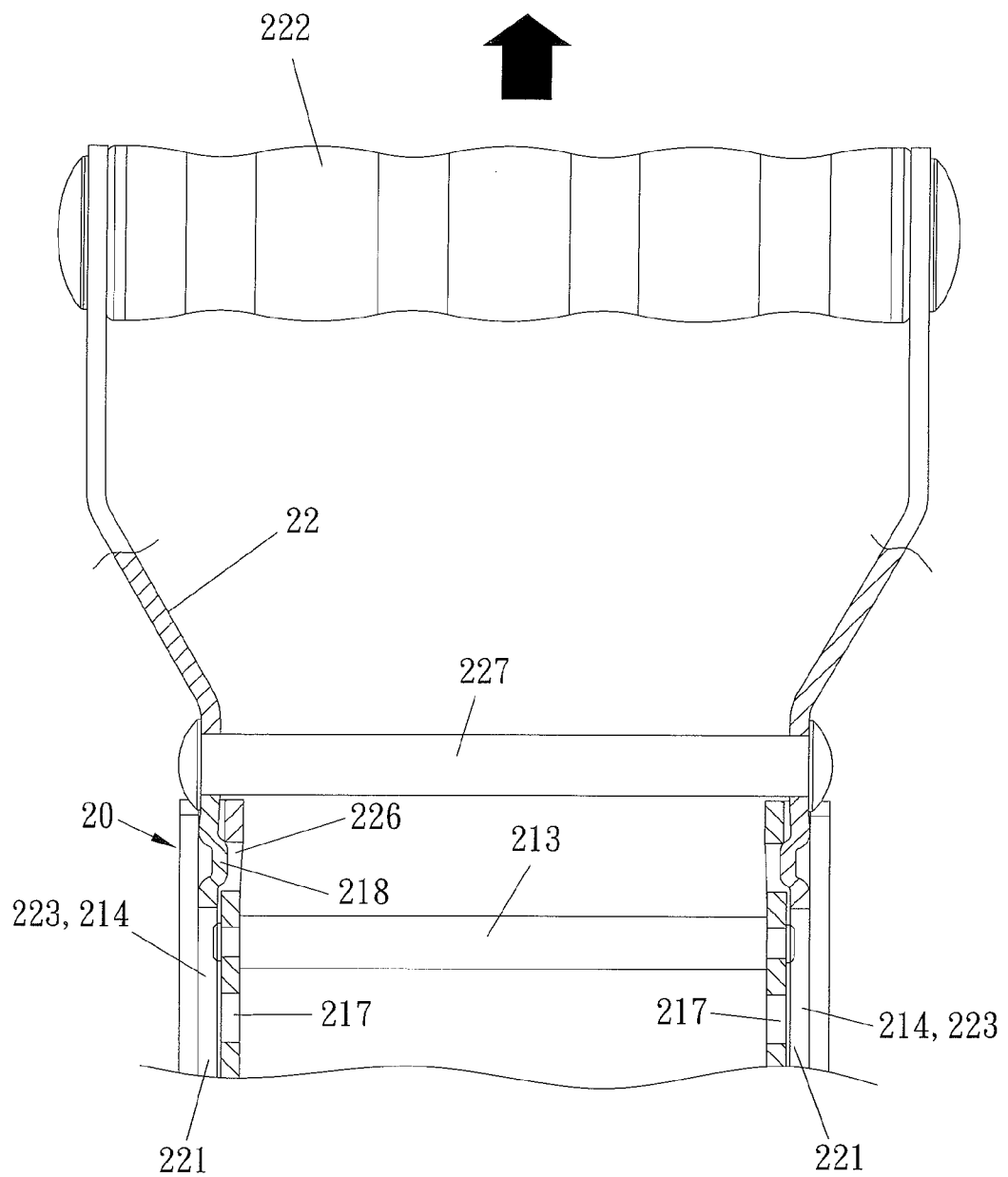
FIG. 4 is a cross sectional view showing the operation of the pull handle structure of the hand puller according to the preferred embodiment of the present invention.
Figure 5:
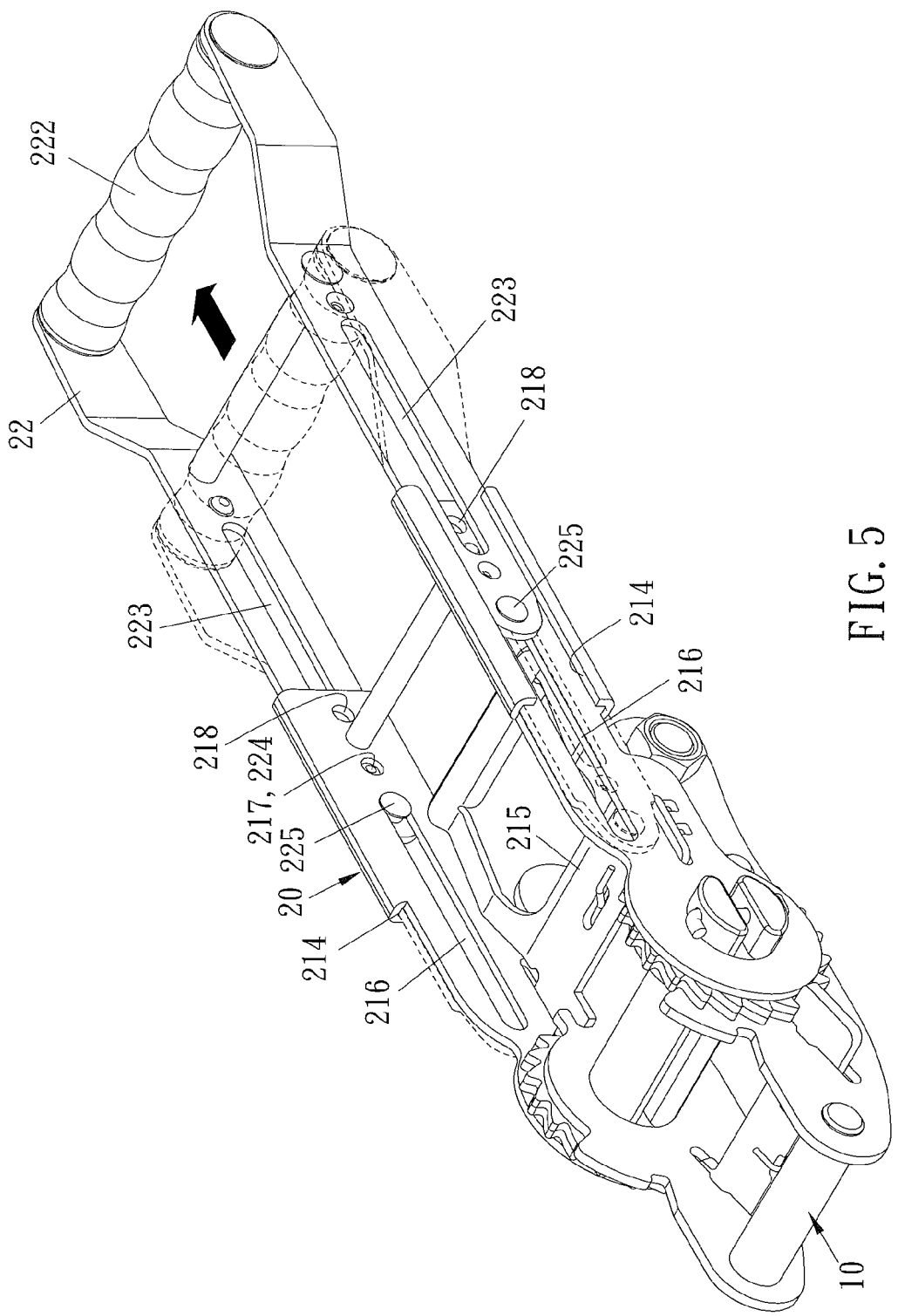
FIG. 5 is a perspective view showing the operation of the pull handle structure of the hand puller according to the preferred embodiment of the present invention.

When rolling the rope to tie merchandise as shown in FIGS. 4 and 5, the movable bar 22 is pulled outward so that the defining tab 225 of the movable bar 22 moves toward another end of the first slot 216, the second tab 226 disengages from the second bore 218, and the first boss 224 retains in the first bore 217 to be positioned. Thereby, the pulling handle 20 is pulled upward and downward to rotate the two shafts 12 in a single direction, thus rolling the rope tightly.

Figure 6:
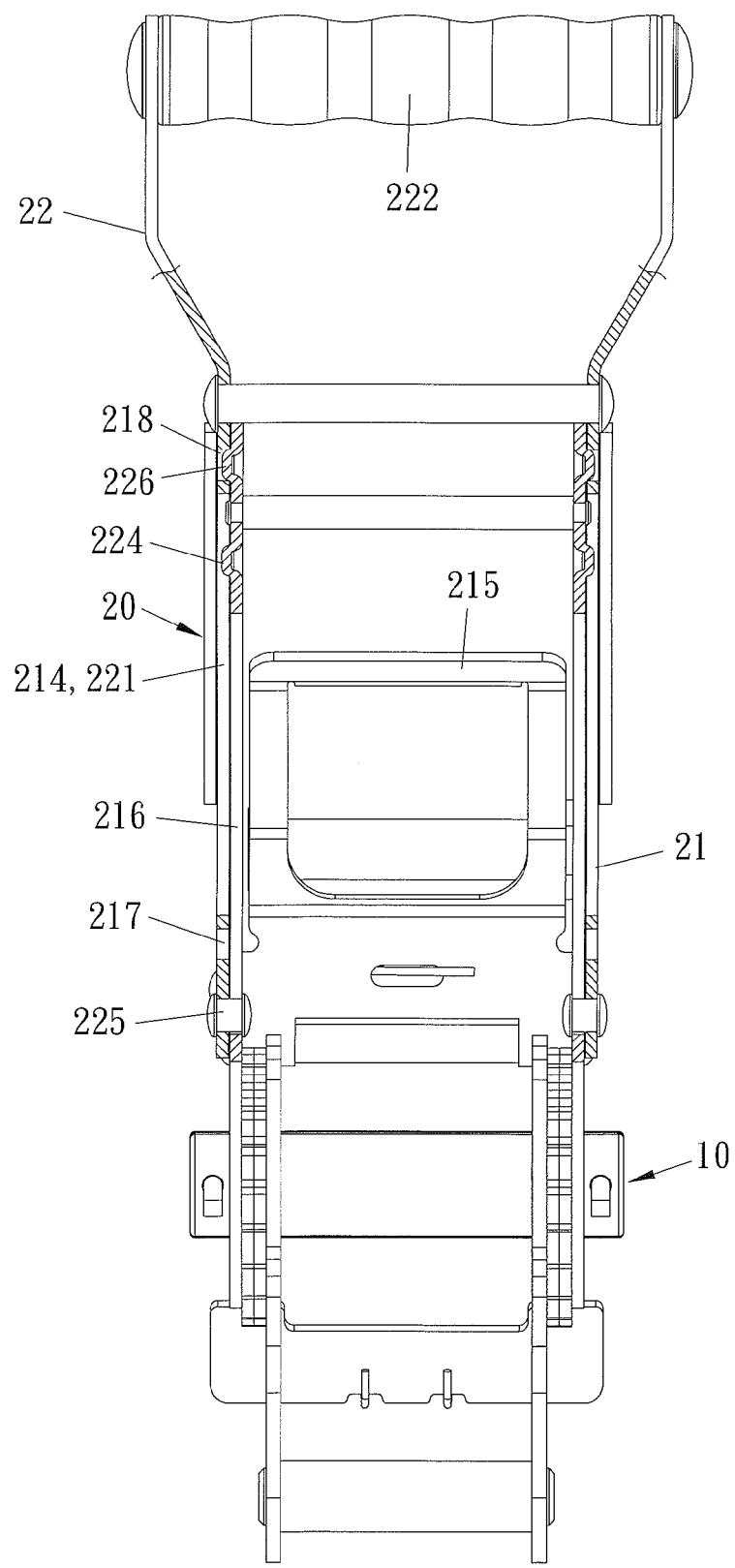
FIG. 6 is a cross sectional view showing the assembly of a pull handle structure of a hand puller according to another preferred embodiment of the present invention.

As illustrated in FIG. 6, installing positions of the first boss 224 and the first bore 217 are capable of being exchanged with each other, and installing positions of the second boss 226 and the second bore 218 are capable of being exchanged with each other, thereby obtaining a positioning purpose.

The pull handle structure of the hand puller of the present invention has the following advantages:

1. When the pulling handle 20 is used on the hand puller to roll the rope, the movable bar 22 is pulled to increase a length of an arm of force, achieving a stronger tie force and a force saving purpose. Besides, the movable bar 22 is retracted in the normal state to reduce a size of the hand puller, thereby saving a store space.

2. When the pulling handle 20 is served to release the rope, the movable bar 22 is retracted, and the grip rod 222 of the movable bar 22 is held to pull the retaining element 215 so that the retaining element 215 disengages from the ratchet 13. Hence, the retaining element 215 does not need to be lengthened, operating the retaining element 215 smoothly.

While various embodiments in accordance with the present invention have been shown and described, it is clear to those skilled in the art that further embodiments may be made without departing from the scope of the present invention.

What is claimed is:

1. A pull handle structure of the hand puller comprising:
a base; and
an expandable and retractable pulling handle, with the base including two opposite holes disposed on a middle section thereof to insert two shafts respectively, with each hole including a ratchet fitted on the shaft, wherein the pulling handle includes a rotating member and a movable bar, wherein the rotating member comprises two side plates, wherein each side plate includes a first end and a second end, wherein each first end includes an axial connecting portion on which a circular opening is formed with the rotating member swinging axially relative to the base, wherein each side plate of the rotating member includes a sliding rail disposed on an outer surface thereof, made of a metal sheet, and formed with a twist, wherein a movable retaining element is defined between the two side plates to contact with teeth of the ratchet in a normal state, wherein the movable bar includes two stems and a grip rod defined between the two stems, wherein each stem is fitted in the sliding rail of the side plate of the rotating member to move slidably, wherein a locking device is defined between the rotating member and the movable bar to obtain a positioning purpose when the movable bar is expanded and retracted, wherein the locking device includes a first bore and a second bore fixed on the second end of the side plate of the rotating member, wherein the stem of the movable bar includes a second slot formed therein, wherein the second slot includes a first boss arranged on one end thereof away from the grip rod and includes a second boss secured on another end thereof, wherein the first boss corresponds to the first bore, and wherein the second boss corresponds to the second bore.

2. The pull handle structure of the hand puller as claimed in claim 1, wherein between the second ends of the two side plates is defined a post.

3. The pull handle structure of the hand puller as claimed in claim 1, wherein the stem of the movable bar of the pulling handle is elongated.

4. The pull handle structure of the hand puller as claimed in claim 1, wherein between the two stems of the movable bar adjacent to the grip rod is defined a limit shaft.

5. The pull handle structure of the hand puller as claimed in claim 1, wherein between the rotating member and the movable bar is defined a limiting structure, wherein the limiting structure includes a first slot disposed in the sliding rail of the side plate of the rotating member, and wherein the stems of the movable bar includes a defining tab arranged on one end thereof away from the grip rod and limited in the first slot of the limiting structure to move.

6. A pull handle structure of the hand puller comprising:
a base; and
an expandable and retractable pulling handle, with the base including two opposite holes disposed on a middle section thereof to insert two shafts respectively, with each hole including a ratchet fitted on the shaft, wherein the pulling handle includes a rotating member and a movable bar, wherein the rotating member comprises two side plates, wherein each side plate includes a first end and a second end, wherein each first end includes an axial connecting portion on which a circular opening is formed with the rotating member swinging axially relative to the base, wherein each side plate of the rotating member includes a sliding rail disposed on an outer surface thereof, made of a metal sheet, and formed with a twist, wherein a movable retaining element is defined between the two side plates to contact with teeth of the ratchet in a normal state, wherein the movable bar includes two stems and a grip rod defined between the two stems, wherein each stem is fitted in the sliding rail of the side plate of the rotating member to move slidably, wherein a locking device is defined between the rotating member and the movable bar to obtain a positioning purpose when the movable bar is expanded and retracted, wherein the locking device includes a first boss and a second boss fixed on the second end of the side plate of the rotating member, wherein the stem of the movable bar includes a second slot formed therein, wherein the second slot includes a first bore arranged on one end thereof away from the grip rod and includes a second bore secured on another end thereof, wherein the first boss corresponds to the first bore, and wherein the second boss corresponds to the second bore.

* * * * *